United States Patent [19]

Pillar

[11] 4,028,285

[45] June 7, 1977

[54] STYRENE POLYMER FOAMS HAVING REDUCED FLAMMABILITY CONTAINING ALLYL ETHER SYNERGISTS

[75] Inventor: Walter Oscar Pillar, Monroeville, Pa.

[73] Assignee: ARCO Polymers, Inc., Philadelphia, Pa.

[22] Filed: Nov. 24, 1976

[21] Appl. No.: 744,578

[52] U.S. Cl. .................. 260/2.5 FP; 260/45.7 R; 260/45.95 G
[51] Int. Cl.² .................. C08K 5/02; C08K 5/06
[58] Field of Search ............. 260/2.5 HB, 2.5 FP, 260/2.5 B, 45.7 R, 45.95 G

[56] References Cited

UNITED STATES PATENTS

| | | | |
|---|---|---|---|
| 3,058,926 | 10/1962 | Eichhorn | 260/2.5 FP |
| 3,271,333 | 9/1966 | Eichhorn | 260/2.5 FP |
| 3,576,771 | 4/1971 | Howell et al. | 260/2.5 FP |
| 3,590,014 | 6/1971 | Burt | 260/2.5 B |
| 3,766,249 | 10/1973 | Howell et al. | 260/2.5 FP |
| 3,819,547 | 6/1974 | Pillar et al. | 260/2.5 FP |
| 3,826,766 | 7/1974 | Howell et al. | 260/2.5 FP |

OTHER PUBLICATIONS

West Germany Offenlegungsschrift 1812951, July 3, 1969.

*Primary Examiner*—V.P. Hoke
*Attorney, Agent, or Firm*—Lewis J. Young

[57] ABSTRACT

The amount of brominated aliphatic compound required to render styrene polymer foams less flammable is reduced by the addition of 0.25 to 0.75% by weight of either allyl phenyl ether or tetraallyloxy propane as synergists for the decomposition of the bromine compound.

4 Claims, No Drawings

STYRENE POLYMER FOAMS HAVING REDUCED FLAMMABILITY CONTAINING ALLYL ETHER SYNERGISTS

BACKGROUND OF THE INVENTION

The invention relates to expanded styrene polymer foams having reduced flammability.

It is well-known to add halogenated organic compounds to sytrene polymer to reduce the flammability of the polymer. In many instances, the amounts of halogenated compounds necessary to effect efficient reduction in flammability also deletereously effect the physical properties and molding properties of the polymer.

It is known to add synergists to the polymer along with the flame retardants to enable less flame retardant to be utilized efficiently. Such known synergists are the heavy metal oxides and sulfides and free-radical initiators. Examples are the oxides and sulfides of antimony, arsenic, and bismuth, and the thermally unstable organic peroxides, nitroso- and azo compounds.

SUMMARY OF THE INVENTION

It has now been found that the addition of 0.25 to 0.75 percent by weight of an allyl ether, selected from the group consisting of tetraalyloxy propane and allyl phenyl ether, to a styrene polymer foam containing 0.2 to 3.0% of a halogenated aliphatic, cycloaliphatic, or araliphatic compound can effect reduced flammability of the foam.

DETAILED DESCRIPTION OF THE INVENTION

In accordance with the invention, a variety of expandable thermoplastic homopolymers and copolymers can be made to have reduced flammability. The polymers may be derived from vinyl aromatic monomers, such as styrene, vinyl toluene, isopropylstyrene, alphamethylstyrene, chlorostyrene, tert-butylstyrene, etc., as well as copolymers prepared by the copolymerization of at least 50 percent by weight of a vinyl aromatic monomer with monomers such as butadiene, alkyl methacrylates, alkyl acrylates, acrylonitrile and maleic anhydride. For the purpose of convenience, these polymers and copolymers are referred to herein as styrene polymers.

The styrene polymers can, of course, be produced by any of the known techniques, for example by suspension or mass polymerization, to obtain particles in the form of beads or pellets.

To render the polymer particles expandable, the blowing agent is incorporated into the particles, as for example in U.S. Pat. No. 2,983,692, by suspending the particles in water with the aid of suspending agent systems such as tricalcium phosphate in combination with an anionic surfactant.

The blowing agents are compounds which are gases or which will produce gases on heating. Suitable agents include aliphatic hydrocarbons containing from 4–7 carbon atoms in the molecule, such as butane, pentane, cyclopentane, hexane, heptane, cyclohexane, and the halogenated hydrocarbons which boil at a temperature below the softening point of the polymer. Mixtures of these agents may also be used, such as a 50/50 mixture of isopentane/n-pentane, or a 55/45 mixture of trichlorofluoromethane/n-pentane. Usually from 3 to 20 percent of blowing agent per 100 parts of polymer is incorporated by the impregnation.

Conventionally, the impregnations are carried out at temperatures from 60° to 150° C., preferrably 80°–100° C. Because higher temperatures tend to decompose the halogen-compound causing discoloration of the polymer and actual degradation of the polymer at the particle surface, use of a stabilizer for the halogen compound is recommended at the higher temperatures of impregnation.

Examples of such stabilizers are the sulfides or metal mercaptides taught in my copending application Ser. No. 689,233, filed May 24, 1976, the barium/cadmium organic complex taught in my copending application Ser. No. 653,688, filed Jan. 30, 1976, and especially preferred are the hindered phenolic antioxidants as taught in my copending application Ser. No. 689,026, filed May 24, 1976.

Preferably the total amount of stabilizer added should be between 0.001 and 0.40% by weight based on the weight of styrene polymer particles to be impregnated. Less than 0.001 weight % of the stabilizer does not prevent degradation of the polymer particles, while greater than 0.40% by weight does not appear to serve any useful function. Generally, the amount of stabilizer required is dependent upon the amount of organic halogen compound used and the type of stabilizer used.

In the preferred process of the invention, styrene polymer particles are suspended in water with the aid of a difficultly-water-soluble suspending agent, such as tricalcium phosphate and an anionic surfactant extender. To the suspension is added from 0.2 to 3 percent by weight, based on polymer, of the desired halogen-compound from 3.0 to 20 percent by weight of the blowing agent, 0.25 to 0.75 percent by weight of an allyl ether synergist, and if desired from 0.001 to 0.40 percent by weight of a stabilizer for the halogen compound. The suspension is then heated to a temperature, preferably between 60°C. and 150° C. for 1 to 15 hours to impregnate the polymer particles and uniformly disperse the halogen-compound throughout the polymer. After the impregnation is complete, the particles are cooled to room temperature, acidified with hydrochloric acid, separated from the aqueous medium, and washed with water. The particles are then dried to produce expandable particles which when molded produce foamed articles having reduced flammability. Foamed articles containing larger amounts of halogen compound, i.e. amounts greater than 3.0 parts per 100 parts of polymer, have reduced flammability without the aid of synergistic amounts of allyl ethers. With lesser amounts of the halogen-compound it is preferred to use from 0.25 to 0.75 parts per 100 parts of polymer of an allyl ether to aid in the decomposition of the halogen-compound when burned. Below 0.25% by weight of synergist, no reduction of flammability is noted, whereas amounts of synergist above 0.75% by weight appear to increase flammability of the polymer. Suitable for the synergist are those allyl ethers selected from the group consisting of allyl phenyl ether and tetraallyloxy propane.

Suitable organic halogen compounds are any of the highly halogenated aliphatic, cycloaliphatic, or araliphatic compounds known to impart reduced flammability to styrene polymer foams. Typcial examples are the pentabromochlorocyclohexane of U.S. Pat. No. 3,058,926; the 1,1,2,3,4,4-hexabromo-2-butene of U.S. Pat. No. 3,819,547; the brominated arylidene ketones of U.S. Pat. No. 3,766,136; the brominated annamic acid esters of U.S. Pat. No. 3,766,249; and the brominated aryl butanes of U.S. Pat. No. 3,826,766. All of the preferred compounds are halogenated only in the aliphatic portion of the compounds.

The invention is further illustrated by the following examples, wherein percentages are percent by weight unless otherwise indicated.

EXAMPLE I

To each of several 12-oz. Crown cap bottles was charged 100 g. of water, 2.0 g. of tricalcium phosphate, 0.05 g. of sodium dodecylbenzene sulfonate, 100 g. of polystyrene beads having bead size of between on 30 and through 16 mesh, U.S. Standard Sieve, and an intrinsic viscosity of 0.77 at 30° C. in toluene, 1.1 g. of pentabromomonochlorocyclohexane, 8.5 g. of n-pentane, and the amounts of potential synergists as shown in Table I.

The bottles were capped and cycled 6 hours at 90° C. in an oil bath polymerizer. The bottles were then cooled to room temperature, opened, acidified with hydrochloric acid, the polymer beads separated from the aqueous medium, washed with water and air dried.

The beads were pre-expanded by heating for 2 minutes in steam to give prepuff having a bulk density of between 0.9 and 1.8 pounds per cubic foot (pcf).

The prepuffed beads were then overcharged to a 5 ½ × 5 ½ × ½ inches mold cavity, dampened with a water spray, pressed between platens heated to 121° C. for 1 minute, and cooled by circulating water in the platens.

A 1 × 5 × ½ inch specimen cut from the resulting foam plaque was hung lengthwise from a clamp over a microburner having a ¾ inch yellow flame. The flame was positioned ¾ inch from the bottom edge of the foam sample for 3 seconds. The average vertical burn time (time from withdrawal of the flame to flame-out of the foam) for 4 samples is shown in Table I. Polystyrene foam not containing the bromo-compound burned completely in this test.

The number of flaming drips per 4 samples tested was also noted by placing untreated surgical cotton one foot below the specimen during the vertical burn test and noting the incidence of ignition of the cotton by burning drips from the specimen.

To compare the synergistic allyl ethers, samples were also run using an azo synergist (2-tert-butylazo-2,4-dimethoxy-4-methylpentane) and a peroxide synergist (1,3-bis(α-tert-butyl-peroxyisopropyl)benzene).

applications where the hazards of peroxides need to be minimized. The ether synergists are as effective as the known azo synergists for the aliphatic-halogen compounds.

EXAMPLE II

To illustrate that the allyl ethers do not aid in the decomposition of brominated aromatic compounds, the procedure of Example I was repeated using 3.0% by weight of decabromodiphenyl oxide as the flame retardant and 0.5, 0.75 and 1.0% by weight of allyl phenyl ether as synergist. All samples burned completely and caused flaming drips in 4 out of 4 samples tested.

I claim:

1. A foamed styrene polymer composition consisting essentially of a styrene polymer foam, 0.2 to 3.0 percent by weight of polymer of a flame retardant selected from the group consisting of halogenated aliphatic compounds, halogenated cycloaliphatic compounds, and halogenated araliphatic compounds, said flame retardants being halogenated only in the aliphatic portion of the molecules, and 0.25 to 0.75 percent by weight of an allyl ether selected from the group consisting of allyl phenyl ether and tetraallyloxy propane.

2. Expandable styrene polymer particles consisting essentially of styrene polymer particles, 3 to 20 percent by weight of an organic blowing agent, 0.2 to 3.0 percent by weight of a flame retardant selected from the group consisting of halogenated aliphatic compouds, halogenated cycloaliphatic compounds, and halogenated araliphatic compounds, said flame retardants being halogenated only in the aliphatic portion of the molecules, and 0.25 to 0.75 percent by weight of an allyl ether selected from the group consisting of allyl phenyl ether and tetraallyloxy propane.

3. A method for improving the flame retardancy of expanded styrene polymers consisting of adding a synergistic amount of an allyl ether, selected from the group consisting of allyl phenyl ether and tetraallyloxy propane, to a styrene polymer containing 0.2 to 3.0 percent by weight of a flame retardant selected from the group consisting of halogenated aliphatic compounds, halogenated cycloaliphatic compounds and halogenated araliphatic compounds; said flame retardants being halogenated only in the aliphatic portion of the molecules.

4. The method of claim 3 wherein said allyl ether is present in an amount of between 0.25 and 0.75 percent

TABLE 1

| Run No. | Synergist | Amount wt.-% | Vertical burn time, sec. | Flaming drips No./No. of tests |
|---|---|---|---|---|
| 1 | none | — | burn | 2/4 |
| 2 | peroxide | 0.875 | 0.5 | 0/4 |
| 3 | azo | 0.25 | 7.0 | 3/4 |
|   |   | 0.50 | 9.0 | 4/4 |
|   |   | 0.75 | burn | 4/4 |
| 4 | allyl phenyl ether | 0.25 | burn | 2/4 |
|   |   | 0.50 | 3.0 | 3/4 |
|   |   | 0.75 | 8.0 | 2/4 |
| 5 | tetraallyloxy propane | 0.25 | burn | 4/4 |
|   |   | 0.50 | 1.1 | 3/4 |
|   |   | 0.75 | burn | 4/4 |

It is obvious from the data Table I that the ethers are not as effective as peroxides as synergists with organic halogen-compounds. The ethers are useful, however, in by weight based on the polymer.

* * * * *